United States Patent Office 2,941,976
Patented June 21, 1960

2,941,976

COPOLYMERS OF POLYESTERS AND OXYGEN-CONTAINING VINYL COMPOUNDS

Joseph Philipson, Temple City, Calif., assignor, by mesne assignments, to Aerojet-General Corporation, Cincinnati, Ohio, a corporation of Ohio No Drawing. Filed Dec. 14, 1950, Ser. No. 200,881

10 Claims. (Cl. 260—45.4)

This invention relates to polymers and in particular to polymers that are tough and flexible over a wide range of temperature.

The principal object of my invention is to produce polymers that maintain a good usable consistency over an unusually wide range of temperature.

Polymers find use in articles or substances which are taken into extremely cold climates such as the arctic, or stratospheric regions, and also into extremely hot climates such as the tropics. It is often a requirement, or very desirable that the polymer shall not flow unduly in the hot regions, nor become very brittle in the cold regions. An important use of such a polymer is as a solid propellant for rocket motors wherein the polymer is used as a fuel in which is mixed an oxidizing material, the resinous fuel acting as a solid binder.

Heretofore polymers have been produced which exhibit suitable properties at low temperatures, but become soft and sag at high temperatures such as 210° F. Conversely other polymers have been made which possess suitable high temperature properties but when cooled to low temperatures, such as —50° F., become very brittle and crack.

In accordance with my invention, I have discovered a new series of polymers that are tough and do not sag at temperatures even as high as 210° F. and yet remain pliable and non-brittle at temperatures as low as —50° F.

In carrying out my invention, I make use of a copolymer of a polyester and an olefin. The polyester should be from a series which is prepared by condensing an alkane dibasic and/or a saturated hydroxy acid with a diol with which there is also included some unsaturation, which can be supplied, for example, by some unsaturation in the dibasic or hydroxy acid component or in the diol.

Examples of alkane dibasic acids that are suitable for this purpose are succinic, pimelic, adipic, glutaric, suberic, azelaic, sebacic, and others. Examples of the saturated hydroxy acids are Ω hydroxy decanoic acid, and Ω hydroxy pentadecanoic acid.

Examples of unsaturated dibasic acids which are suitable for supplying the desired degree of unsaturation are maleic, fumaric, citraconic, mesaconic, itaconic, dilinoleic acids as well as maleic anhydride, citraconic anhydride and itaconic anhydride. Examples of the aromatic type of dibasic acids are phthalic acid, isophthalic acid, terephthalic acid as well as phthalic anhydride, naphthalic acid, diphenyl-O-O'-dicarboxylic acid, etc.

An example of an unsaturated hydroxy acid for supplying the unsaturation is ricinoleic acid.

Examples of the diols that are suitable for carrying out my invention are diethylene glycol, 1,3-butanediol, propylene glycol, 1,5-pentanediol, 2-ethyl-hexanediol-1,3, etc.

The olefin usable for the copolymerization with the polyester can be a vinyl and/or allyl type of oxygen containing monomer compatible with the particular type of polyester used. The term "compatible" as used herein means that the olefinic monomer is soluble in the polyester and will copolymerize with it. Examples of vinyl and allyl type compounds are the acrylates such as methyl acrylate, ethyl acrylate and propyl acrylate, and the corresponding methacrylates, vinyl acetate, octyl acrylate, diethylene glycol bis (allyl-carbonate), diallyl phthalate, diallyl maleate, diallyl fumarate, and diallyl diglycolate, etc.

Copolymers of this general nature are not new and as such do not constitute the present invention.

In accordance with a feature of my invention, I have discovered that a particular olefinic copolymerizing component, namely n-butyl acrylate, is exceptionally effective in reaching the object of my invention. n-Butyl acrylate, polymerizes to a rubber-like polymer which becomes quite brittle at temperatures below approximately —40° C. and becomes quite soft at temperatures only slightly above room temperature. While such a polymer does not have the desirable temperature characteristics which are the object of my invention, and is furthermore unduly weak and possessed of poor tear resistance, I have nevertheless discovered that n-butyl acrylate is unique in that when it is copolymerized with any of the polyesters possessing the unsaturation classified above, it forms rubbery and unexpectedly tough copolymers which remain flexible throughout a wide temperature range. In some cases the copolymer may be chilled to as low as about —90° F., and yet such a copolymer will exhibit no viscous flow at very high temperatures even up to 210° F. Furthermore, coupled with this good temperature characteristic, the copolymer exhibits exceptionally good strength and tear resistance, making it useful in articles and substances which could not tolerate a weaker polymer or one having poor physical properties.

A further important feature of my invention resides in my discovery that the degree of unsaturation in the polyester should lie between 4 and 6 mole percent to enable the polyester properly to copolymerize with the olefin. If the proportion of the unsaturated component is less than about 4 mole percent, it will be impractical to form a copolymer since there is insufficient unsaturation to permit copolymerization, and if more than about 6 mole percent it will be too brittle, for use in a propellant in both hot and cold regions.

A further salient feature of the invention resides in my discovery that the olefin used to copolymerize with the polyester must lie within the range of 60% to 85% by weight based on the weight of the entire copolymer. The preferred amount of the olefin is about 70% by weight, particularly when n-butyl acrylate is used for the olefin. If the olefin is greater or less than the limits specified above the copolymer formed would be weak and will have very poor tear resistance.

The following examples set forth some of the polyesters which can be satisfactorily copolymerized with one of the unsaturated monomeric compounds mentioned above:

*Example 1*

10.5 moles diethylene glycol, 9 moles adipic acid, and 1 mole maleic anhydride. This resin will hereafter be referred to as Resin A.

*Example 2*

10 moles of diethylene glycol, 9 moles of adipic acid and 1 mole of maleic anhydride. This resin will hereafter be referred to as Resin B.

*Example 3*

10 moles of diethylene glycol, 4.5 moles adipic acid, 4.5 moles sebacic acid, and 1 mole of maleic anhydride. This resin will hereafter be referred to as Resin C.

Example 4

5 moles of diethylene glycol, 5 moles of dipropylene glycol, 9 moles of adipic acid and 1 mole of maleic anhydride. This resin will hereafter be referred to as Resin D.

Example 5

10 moles of propylene glycol, 9 moles adipic acid, and 1 mole maleic anhydride. This resin will hereafter be referred to as Resin E.

Example 6

10 moles of 1,3-butanediol, 9 moles of adipic acid, 1 mole maleic anhydride. This resin will hereafter be referred as Resin F.

Example 7

10 moles of 2-ethyl-hexanediol-1,3, 9 moles of adipic acid, 1 mole of maleic anhydride. This resin will hereafter be referred to as Resin G.

Example 8

10.5 moles of diethylene glycol, 9 moles of azelaic acid and 1 mole of maleic anhydride. This resin will hereafter be referred to as Resin H.

Example 9

10 moles of diethylene glycol, 4.5 moles of adipic acid and 4.5 moles of azelaic acid and 1 mole of maleic anhydride. This resin will hereafter be referred to as Resin I.

Example 10

10 moles of 1,5-pentanediol, 9 moles of adipic acid, and 1 mole maleic anhydride. This resin will hereafter be referred to as Resin K.

Example 11

2 moles of diethylene glycol, 2 moles of 1,5 pentanediol, 2 moles of propylene glycol, 2 moles of 1,3-butanediol, 2 moles of 2-ethyl-1,3 hexanediol, 3 moles of adipic acid, 3 moles of azelaic acid, 3 moles sebacic acid, and 1 mole maleic anhydride. This resin will hereafter be referred to as Resin L.

Example 12

10 moles of diethylene glycol, 9 moles of sebacic acid, and 1 mole of maleic anhydride. This resin will hereafter be referred to as Resin M.

Example 13

10 moles of diethylene glycol, 9 moles of adipic acid, and 1 mole of fumaric acid. This resin will hereafter be referred to as Resin N.

Example 14

9.5 moles of diethylene glycol, 9.5 moles adipic acid, and 1 mole ricinoleic acid. This resin will be hereafter referred to as Resin P.

Example 15

5 moles diethylene glycol, 5 moles adipic acid, 9 moles Ω hydroxy decanoic acid, and 1 mole maleic anhydride. This resin will hereafter be referred to as Resin R.

The condensation process by which the polyester is formed is briefly as follows: The ingredients comprising the saturated dicarboxylic acid, the saturated diol and the unsaturated dicarboxylic acid are mixed together and heated to a temperature of approximately 140° C. until the water formed by the reaction is substantially driven off. This process is carried out in an atmosphere of inert gas such as nitrogen, carbon dioxide, helium, etc. When the water has been substantially removed the reaction product may then be subjected to higher temperatures not exceeding 250° C. The preferred temperature range for the final stage of the condensation is between 200 and 230° C. The condensation is continued until the polyester has reached either a desired degree of polymerization as determined by an acid number or by measuring the viscosity of the polyester. The preferred degree of polymerization for the application described above is between 5 and 100. The remaining product is generally a viscous liquid which is cooled and then stored ready for polymerization with an unsaturated compound.

The manner in which the copolymer is formed is as follows: The polyester resin is mixed with the compatible unsaturated compound until the solution is substantially homogeneous. The solution is polymerized by the use of heat and/or polymerization catalysts, usually an organic peroxide or perester, in a manner that is well known to the art. The temperature in which the copolymerization takes place is generally in the range of 20°–100° C. Examples of the organic peroxides are tertiary butyl hydroperoxide, 1 - hydroxycyclohexyl hydroperoxide - 1, methyl ethyl ketone peroxide, benzoyl peroxide, cumene hydroperoxide, lauryl peroxide, methyl amyl ketone peroxide, etc. Organic peresters are t-butyl perbenzoate, di-t-butyl diperphthalate, etc. When a catalyst is used it is generally employed in amounts ranging between 0.5%–2.0% by weight based on the weight of the substances to be polymerized.

Some examples of suitable copolymers formed from the above polyester resins with n-butyl acrylate as the principal olefinic ingredient are shown below. All percentages indicated in the examples are by weight based on the weight of the total copolymerizable ingredients. The amount of catalyst that is employed is not included as a part of the copolymerizable ingredients but is in addition thereto.

Example A

65% by weight n-butyl acrylate
10% by weight methyl acrylate
25% by weight Resin A
Add to this mixture 1% by weight methyl ethyl ketone peroxide.

Example B

60% by weight n-butyl acrylate
40% by weight Resin C
Add to this mixture 1.25% by weight of 1-hydroxycyclohexyl hydroperoxide-1.

Example C

60% by weight n-butyl acrylate
10% by weight ethyl acrylate
30% by weight Resin H
Add to this mixture .75% by weight t-butyl perbenzoate.

Example D

70% by weight n-butyl acrylate
30% by weight Resin I
Add to this mixture 1.25% by weight methyl amyl ketone peroxide.

Example E

40% by weight n-butyl acrylate
20% by weight methyl acrylate
40% by weight Resin A
Add to this mixture 1% by weight cumene hydroperoxide.

Example F

65% by weight n-butyl acrylate
10% by weight methyl acrylate
25% by weight Resin M
Add to this mixture 1.5% by weight tertiary butyl perbenzoate.

Example G

60% to 85% by weight n-butyl acrylate
15% to 40% by weight Resin A
Add to this mixture 0.5% to 2% by weight of an organic perester or peroxide.

Example H

60% to 85% by weight n-butyl acrylate
15% to 40% by weight Resin I
Add to this mixture 0.5% to 2% by weight of an organic perester or peroxide.

Example I

60% to 85% by weight n-butyl acrylate
15% to 40% by weight Resin A
0% to 15% methyl acrylate
Add to this mixture 0.5% to 2% by weight of an organic perester or peroxide.

Example J

60% to 85% by weight n-butyl acrylate
15% to 40% by weight Resin I
0% to 15% by weight methyl acrylate
Add to this mixture 0.5% to 2% by weight of an organic perester or peroxide.

Example K

65% by weight n-butyl acrylate
25% by weight Resin I
10% by weight methyl acrylate
Add to this mixture 0.5% to 2% by weight of an organic perester or peroxide.

An advantage of my copolymers is that they can be used as resins in cases where a pliable polymerization product is required which will remain ductile and soft even at low temperatures. This copolymer is particularly useful in the manufacture of propellants which are to be exposed to a wide range of temperatures and which require that the binder material does not become unnecessarily brittle or soft when exposed to temperature extremes.

The advantage of making propellants by employing this type of fuel as a binder is that the substance remains substantially flexible at all temperatures, therefore, avoiding cracking when the propellant is subject to sudden temperature changes.

I claim:

1. A copolymer consisting of a polyester obtained by condensing a substance from the group consisting of an alkane dicarboxylic acid and mixtures of alkane dicarboxylic acids with a dihydroxy alcohol in the presence of 4 to 6 mole percent based on the weight of the total polyester of an unsaturated compound selected from the group consisting of unsaturated dicarboxylic acids in which a double bond occurs between aliphatic carbon atoms and unsaturated hydroxy acids in which a double bond occurs between aliphatic carbon atoms, said polyester being copolymerized with from 60 to 85% by weight based on the weight of the total copolymer of a vinyl monomer having oxygen in the molecule, and mixtures thereof compatible with said polyester resin, the polyester being present in an amount varying between 40% to 15% by weight based on the weight of the total polymer, said copolymerization taking place in the presence of about 0.5% to 2% by weight based on the weight of the total copolymer of a compound selected from the group consisting of organic peresters and peroxides.

2. A copolymer consisting of a polyester formed by condensing an acidic component selected from the group consisting of an alkane dicarboxylic acid, mixtures of alkane dicarboxylic acids and an alkane hydroxy acid with a dihydroxy alcohol in the presence of 4 to 6 mole percent of an unsaturated compound selected from the group consisting of unsaturated dicarboxylic acids in which a double bond occurs between aliphatic carbon atoms and unsaturated hydroxy acid in which a double bond occurs between aliphatic carbon atoms, said polyester being copolymerized with from 60 to 85% by weight based on the weight of the total copolymer of a vinyl monomer having oxygen in the molecule, and mixtures thereof compatible with said polyester resin, said copolymerization taking place in the presence of about 0.5% to 2% by weight based on the weight of the total copolymer of a compound selected from the group consisting of organic peresters and peroxides.

3. A copolymer consisting of a polyester obtained by condensing an alkane dicarboxylic acid with dihydroxy alcohol in the presence of 4 to 6 mole percent of an unsaturated compound selected from the group consisting of unsaturated dicarboxylic acids in which a double bond occurs between aliphatic carbon atoms, unsaturated hydroxy acids in which a double bond occurs between aliphatic carbon atoms, said polyester being copolymerized with between 60% and 85% by weight based on the weight of the total copolymer of a vinyl monomer having oxygen in the molecule, and mixtures thereof compatible with said polyester resin, said copolymerization taking place in the presence of about 0.5% to 2% by weight based on the weight of the total copolymer of a compound selected from the group consisting of organic peresters and peroxides.

4. A polymer consisting of the copolymerization product of a polyester formed by condensing 10.5 moles of diethylene glycol, 9 moles of adipic acid and 1 mole of maleic anhydride with from 60% to 85% by weight based on the weight of the total copolymer of n-butyl acrylate, said copolymerization taking place in the presence of from about 0.5% to 2% by weight based on the weight of the total copolymer of a compound selected from the group consisting of organic peresters and peroxides.

5. A polymer consisting of the copolymerization product of a polyester formed by condensing 10 moles of diethylene glycol, 4.5 moles of adipic acid, 4.5 moles of azelaic acid and 1 mole of maleic anhydride with from 60% to 85% by weight based on the weight of the total copolymer of n-butyl acrylate, said copolymerization taking place in the presence of about 0.5% to 2% by weight based on the weight of the total copolymer of a compound selected from the group consisting of organic peresters and peroxides.

6. A polymer consisting of the copolymerization product of a polyester formed by condensing 10 moles of diethylene glycol, 4.5 moles of adipic acid, 4.5 moles of azelaic acid and 1 mole of maleic anhydride with 70% by weight based on the weight of the copolymer of n-butyl acrylate, said copolymerization taking place in the presence of about 0.5% to 2% by weight based on the weight of the total copolymer of a compound selected from the group consisting of organic peresters and peroxides.

7. A polymer obtained by copolymerizing from 15 to 40% by weight based on the weight of the total copolymer of a polyester formed by condensing 10.5 moles diethylene glycol, 9 moles adipic acid, and 1 mole maleic anhydride with from 60% to 85% by weight based on the weight of the total copolymer of n-butyl acrylate and from 0% to 15% by weight based on the weight of the total copolymer of methyl acrylate, the copolymerization taking place in the presence of about 0.5% to 2% by weight based on the weight of the total copolymer of a compound selected from the group consisting of organic peresters and peroxides.

8. A polymer obtained by copolymerizing 25% by weight based on the weight of the total copolymer of a polyester formed by condensing 10.5 moles diethylene glycol, 9 moles adipic acid, 1 mole maleic anhydride with 65% by weight based on the weight of the total copolymer of n-butyl acrylate and about 10% by weight based on the weight of the total copolymer of methyl acrylate, the copolymerization taking place in the presence of about 0.5% to 2% by weight based on the weight of the total copolymer of a compound selected from the group consisting of organic peresters and peroxides.

9. A polymer obtained by copolymerizng from 15% to 40% by weight based on the weight of the total copolymer of a polyester formed by condensing 10 moles diethylene glycol, 4.5 moles adipic acid, 4.5 moles azelaic acid and 1 mole maleic anhydride with from 60% to 85% by weight based on the weight of the total copolymer of n-butyl acrylate and from about 0% to 15% by weight based on the weight of the total copolymer of methyl acrylate, the copolymerization taking place in the presence of about 0.5% to 2% by weight based on the weight of the total copolymer of a compound selected from the group consisting of organic peresters and peroxides.

10. A polymer obtained by copolymerizing 25% by weight based on the weight of the total copolymer of a polyester formed by condensing 10 moles diethylene glycol, 4.5 moles adipic acid, 4.5 moles azelaic acid and 1 mole maleic anhydride with 65% by weight based on the weight of the total copolymer of n-butyl acrylate and about 10% by weight based on the weight of the total copolymer of methyl acrylate, the copolymerization taking place in the presence of about 0.5% to 2% by weight based on the weight of the total copolymer of a compound selected from the group consisting of organic peresters and peroxides.

References Cited in the file of this patent

UNITED STATES PATENTS

| | | |
|---|---|---|
| 2,255,313 | Ellis | Sept. 9, 1941 |
| 2,406,298 | King | Aug. 20, 1946 |
| 2,443,613 | Fuller | June 22, 1948 |
| 2,443,735 | Kropa | June 22, 1948 |
| 2,472,963 | Singleton et al. | June 14, 1949 |